US007953978B2

(12) United States Patent
Greco et al.

(10) Patent No.: US 7,953,978 B2
(45) Date of Patent: May 31, 2011

(54) KEY GENERATION AND RETRIEVAL USING KEY SERVERS

(75) Inventors: Paul Merrill Greco, Tucson, AZ (US);
Timothy James Hahn, Cary, NC (US);
Glen Alan Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1029 days.

(21) Appl. No.: 11/530,006

(22) Filed: Sep. 7, 2006

(65) Prior Publication Data

US 2008/0065889 A1 Mar. 13, 2008

(51) Int. Cl.
*H04L 9/32* (2006.01)
*G06F 11/30* (2006.01)
(52) U.S. Cl. .......................... 713/171; 713/193; 380/278
(58) Field of Classification Search .................. 713/171
See application file for complete search history.

(56) References Cited

U.S. PATENT DOCUMENTS

| 6,023,643 | A | 2/2000 | Jesionowski |
| 6,295,361 | B1 | 9/2001 | Kadansky et al. |
| 6,567,914 | B1 | 5/2003 | Just et al. |
| 6,807,277 | B1 * | 10/2004 | Doonan et al. ................ 380/281 |
| 6,915,434 | B1 | 7/2005 | Kuroda et al. |
| 6,918,040 | B2 | 7/2005 | Ries et al. |
| 6,950,522 | B1 | 9/2005 | Mitchell et al. |
| 6,990,580 | B2 * | 1/2006 | Go et al. ......................... 713/168 |
| 7,013,389 | B1 | 3/2006 | Srivastava et al. |
| 7,117,362 | B2 * | 10/2006 | Go et al. ......................... 713/168 |
| 7,124,297 | B2 * | 10/2006 | Go et al. ......................... 713/168 |
| 2002/0029199 | A1 * | 3/2002 | Go et al. ........................... 705/51 |
| 2002/0046286 | A1 * | 4/2002 | Caldwell et al. .............. 709/229 |
| 2002/0076055 | A1 * | 6/2002 | Filipi-Martin et al. ........ 380/282 |
| 2002/0126850 | A1 * | 9/2002 | Allen et al. .................... 380/277 |
| 2002/0164035 | A1 | 11/2002 | Yokota et al. |
| 2003/0081787 | A1 | 5/2003 | Kallahalla et al. |
| 2003/0099362 | A1 | 5/2003 | Rollins |
| 2004/0143733 | A1 * | 7/2004 | Ophir et al. ................... 713/153 |
| 2005/0071591 | A1 | 3/2005 | Goodman et al. |

(Continued)

FOREIGN PATENT DOCUMENTS

CN 1801696 7/2006

OTHER PUBLICATIONS

U.S. Patent Application entitled "Selective Encryption of Data Stored on Removable Media in an Automated Data Storage Library", U.S. Appl. No. 11/470,670, filed Sep. 7, 2006, by inventors B. G. Goodman, J.A. Fisher, and L.G. Jesionowski.

(Continued)

*Primary Examiner* — Emmanuel L Moise
*Assistant Examiner* — Luu Pham
(74) *Attorney, Agent, or Firm* — Janaki K. Davda; Konrad Raynes & Victor LLP

(57) ABSTRACT

Provided are techniques for key generation and retrieval. Unique identifiers of two or more key servers are stored, wherein each key server is capable of generating keys for encryption of data and of returning keys for decryption of data. A key request is received. A technique for selecting one of the key servers to which the key request is to be forwarded is identified. One of the key servers is selected using the identified technique. The key request is sent to the identified key server.

24 Claims, 8 Drawing Sheets

U.S. PATENT DOCUMENTS

| | | | |
|---|---|---|---|
| 2005/0086471 A1 | 4/2005 | Spencer | |
| 2005/0125684 A1* | 6/2005 | Schmidt | 713/200 |
| 2005/0165770 A1* | 7/2005 | Go et al. | 707/3 |
| 2005/0165771 A1* | 7/2005 | Go et al. | 707/3 |
| 2005/0198170 A1* | 9/2005 | LeMay et al. | 709/206 |
| 2005/0204161 A1 | 9/2005 | Caronni | |
| 2005/0207570 A1 | 9/2005 | Yamamoto et al. | |
| 2005/0226423 A1 | 10/2005 | Li et al. | |
| 2006/0004662 A1* | 1/2006 | Nadalin et al. | 705/50 |
| 2006/0010324 A1* | 1/2006 | Appenzeller et al. | 713/171 |
| 2006/0031249 A1* | 2/2006 | Peden et al. | 707/103 R |
| 2006/0062383 A1 | 3/2006 | Kaneda et al. | |
| 2006/0075228 A1* | 4/2006 | Black et al. | 713/167 |
| 2006/0149962 A1* | 7/2006 | Fountain et al. | 713/151 |
| 2007/0016663 A1* | 1/2007 | Weis | 709/223 |
| 2007/0143388 A1* | 6/2007 | Futa et al. | 708/492 |

OTHER PUBLICATIONS

"Advanced Encryption Standard (AES)", Federal Information Processing Standards Publication 197, Nov. 26, 2001, pp. 1-51.

"IBM TotalStorage Enterprise Tape System 3592—SCSI Reference" IBM Corporation, Document No. GA32-0466-02, Oct. 2005.

D.A. McGrew, et al., "The Galois/Counter Mode of Operation (GCM)", May 31, 2005, pp. 1-44.

"IEEE P1619.1/D8 Draft Standard Architecture for Encrypted Variable Block Storage Media", IEEE, 2006, pp. 1-26.

U.S. Patent Application entitled "Configuring A Storage Drive to Communicate With Encryption And Key Managers", U.S. Appl. No. 11/530,022, filed Sep. 7, 2006, by inventors B.G. Goodman, G.A. Jaquette, L.G. Jesionowski and P.M. Greco.

U.S. Patent Application entitled "Keyless Encrypted Data", U.S. Appl. No. 11/530,008, filed Sep. 7, 2006, by inventors P.M. Greco and G.A. Jaquette.

U.S. Patent Application entitled "Maintaining Encryption Key Integrity", U.S. Appl. No. 11/530,012, filed Sep. 7, 2006, by inventors P.M. Greco, MJ Sandberg and S.J. Schaffer.

U.S. Patent Application entitled "Encryption Policy Based on Data Context Recognition", U.S. Appl. No. 11/530,011, filed Sep. 7, 2006, by inventors P.M. Greco, G. A. Jaquette and W.E. Rhoten.

U.S. Patent Application entitled "Detection And Handling of Encryption Key And Initialization Vector", U.S. Appl. No. 11/530,010, filed Sep. 7, 2006, by inventores P.M. Greco, M.J. Sandberg, and S.J. Schaffer.

U.S. Patent Application entitled "Verification of Encryption Key", U.S. Appl. No. 11/530,009, filed Sep 7, 2006, by inventors P.M. Greco, S. Halevi and G.A. Jaquette.

U.S. Patent Application entitled "Automatically Filling A Drive Table", U.S. Appl. No. 11/530,013, filed Sep. 7, 2006, by inventors T.J. Hahn and G.A. Jaquette.

U.S. Patent Application entitled "Recovering Remnant Encrypted Data on a Removable Storage Media", U.S. Appl. No. 11/530,021, filed Sep. 7, 2006, by inventors E.M. Dawson, P.M. Greco, G.A. Jaquette, and J.M. Karp.

U.S. Patent Application entitled "Validating an Encryption Key File on Removable Storage Media", U.S. Appl. No. 11/530,019, filed Sep. 7, 2006, by inventors H. Itagaki, J.M. Karp, H. Nakayama, T. Shiratori and P.M. Greco.

U.S. Patent Application entitled "Data Library Background Operations System Apparatus And Method", U.S. Appl. No. 11/470,964, filed Sep. 7, 2006, by inventors B.G. Goodman and L.G. Jesionowski.

U.S. Patent Application entitled "Secure Transmission of Cryptographic Key", U.S. Appl. No. 11/530,014, filed Sep. 7, 2006, by inventors P.M. Greco, M.J. Sandberg, and S.J. Schaffer.

U.S. Patent Application entitled "Rekeying Encryption For Removable Storage Media", U.S. Appl. No. 11/470,994, filed Sep. 7, 2006, by inventors J.A. Fisher, B.G. Goodman, G.A. Jaquette, and L.G. Jesionowski.

U.S. Patent Application entitled "Apparatus, System, And Method For Self-Describing Heterogenous Magnetic Tape Formatting", U.S. Appl. No. 11/679,736, filed Feb. 27, 2007, by inventors, G.A. Jaquette, S.J. Schaffer and T. Shiratori.

U.S. Patent Application entitled "System And Method For Processing User Data in an Encryption Pipeline", U.S. Appl. No. 11/688,445, filed Mar. 20, 2007, by inventors P.M. Greco, S. Halevi, and G.A. Jaquette.

U.S. Patent Application entitled "Method, System And Apparatus For Dynamically Validating a Data Encryption Operation", U.S. Appl. No. 11/285,408, filed Nov. 22, 2005, inventors P.M. Greco, M.J. Sandberg, and S.J. Schaffer.

U.S. Patent Application entitled "Use of Indirect Data Keys For Encypted Tape Cartridges", U.S. Appl. No. 11/472,819, filed May 1, 2007, by inventors P.M. Greco, S. Halevi, and G.A. Jaquette.

Chinese Office Action dated Apr. 29, 2010 for Application No. 200710146557.6, 4 pp.

English abstract of Chinese patent CN 1801696 publication date Jul. 12, 2006, 1 p.

* cited by examiner

Techniques to be Used to Select Key Server 300

- Select Key Server using order of IP addresses of Key Servers. — 302
- Select Key Server using connection information. — 304
- Select Key Server based on local IP addresses and remote IP addresses, such that local IP addresses are selected before remote IP addresses. — 306
- Select Key Server based on load balancing among Key Servers. — 308

FIG. 3

KEY GENERATION AND RETRIEVAL USING KEY SERVERS

BACKGROUND

1. Field

Embodiments of the invention relate to key generation and retrieval using key servers.

2. Description of the Related Art

Automated data storage libraries (e.g. tape libraries including tape drives) are known for providing cost effective storage and retrieval of large quantities of data. The data in automated data storage libraries is stored on data storage media (e.g. tape cartridges) that are, in turn, stored in storage slots (or storage shelves or the like) inside the library in a fashion that renders the data storage media, and its resident data, accessible for physical retrieval. An accessor may be used to move data storage media (e.g., tape cartridges) between the storage slots and data storage drives (e.g., tape drives). Such data storage media is commonly termed "removable media," Data storage media may comprise any type of media on which data may be stored and which may serve as removable media, including but; not limited to magnetic media (such as magnetic tape or disks), optical media (such as optical tape or disks), electronic media (such as PROM, EEPROM, flash PROM, Compactflash™, Smartmedia™, Memory Stick™, etc.), or other suitable media. Typically, the data stored in automated data storage libraries is resident on data storage media that is contained within a cartridge and referred to as a data storage media cartridge. An example of a data storage media cartridge that is widely employed in automated data storage libraries for mass data storage is a tape cartridge, Sometimes data that is written to the data storage media by an encryption-capable data storage drive is encrypted by the drive, and sometimes encrypted data that is read from the data storage media needs to be decrypted. Encryption may be described as the transformation of data into a form, called a ciphertext, using an encryption key that cannot be easily transformed hack to the original data without the decryption key. Decryption may be described as the process of transforming the encrypted data back into its original form using a decryption key. Notwithstanding current techniques for storing and retrieving encrypted data, there is a need in tire art for key generation and retrieval using key servers.

SUMMARY OF EMBODIMENTS OF THE INVENTION

Provided are a method, computer program product, and system for generation and retrieval. Unique identifiers of two or more key servers are stored, wherein each key server is capable of generating keys for encryption of data and of returning keys for decryption of data. A key request is received. A technique for selecting one of the key servers to which the key request is to be forwarded is identified. One of the key servers is selected using the identified technique. The key request is sent to the identified key server.

BRIEF DESCRIPTION OF THE DRAWINGS

Referring now to the drawings in which like reference numbers represent corresponding parts throughout:

FIG. 3 illustrates examples of techniques to be used to select a key server in accordance with certain embodiments.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1A:
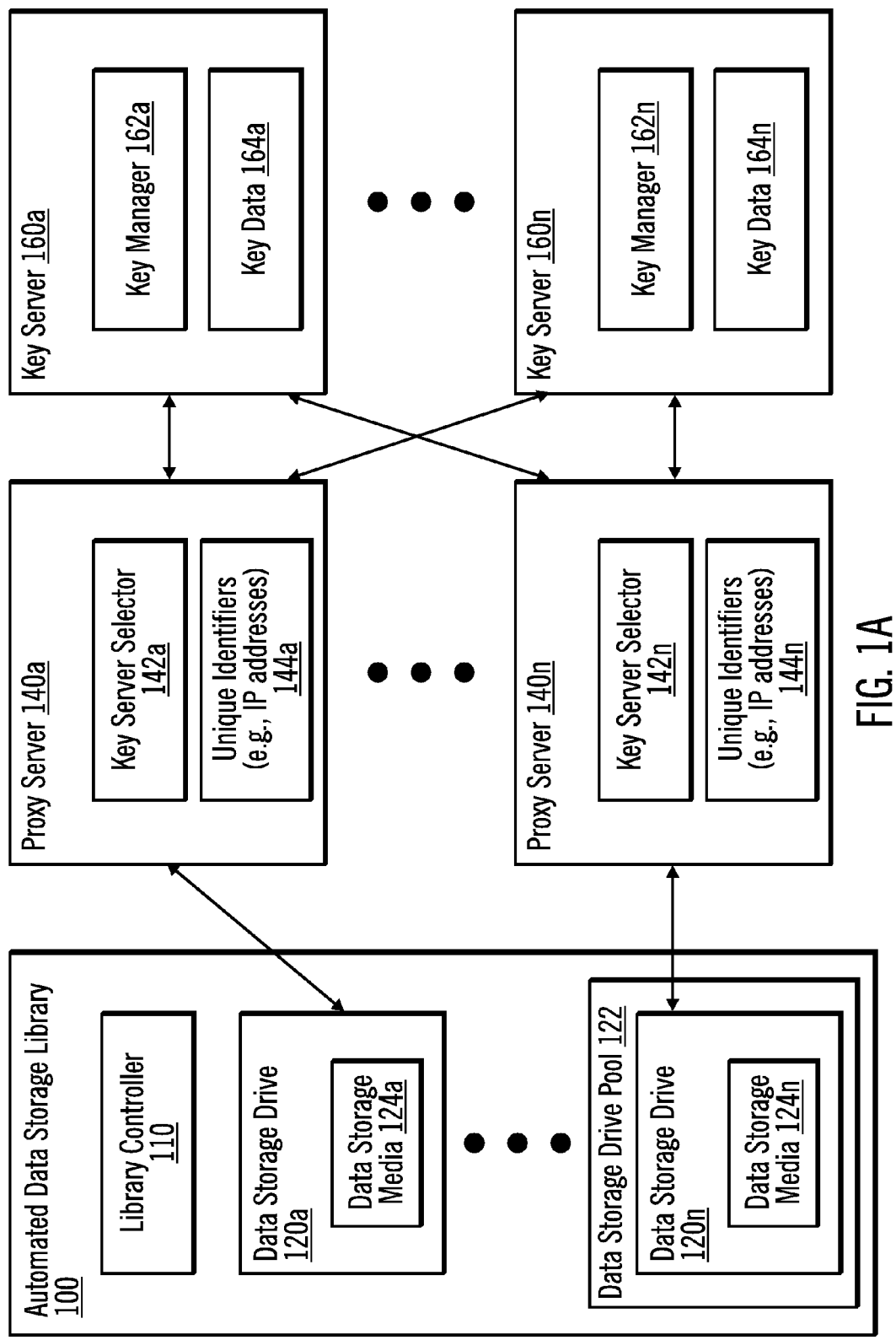
FIG. 1A illustrates details of a computing architecture in accordance with certain embodiments.

FIG. 1A illustrates details of a computing architecture in accordance with certain embodiments. An automated data storage library 100 includes a library controller 110, data storage drives 120a . . . 120n (e.g. tape drives), and media inserted into those data storage drives 120a . . . 120n, such as data storage media 124a . . . 124n. Each data storage drive 120a . . . 120n is loaded with data storage media 124a . . . 124n (e.g. tape cartridges). The data storage drives 120a . . . 120n enable reading information from and writing information to data storage media 124a . . . 124n (e.g. tape cartridges). It is to be understood that the use of ellipses and suffixes of "a" and "n" after a reference number (e.g. 124a . . . 124n) in the diagram indicates that fewer or more elements than those shown may be used without departing from the scope of embodiments. Also, the data storage drives are encryption-enabled data storage drives (i.e. they are able to encrypt data that is stored on data storage media 124a . . . 124n and decrypt encrypted data that is read from the data storage media 124a . . . 124n). In certain embodiments, the data storage drives 120a . . . 120n are tape drives that move tape cartridges, as well as enable reading information to and writing information from those tape cartridges. The data storage drives 120a . . . 120n may be grouped into one or more data storage drive pools. For example, data storage drive 120a . . . 120n is part of data storage drive pool 122. As another example, the data storage drive pools may be tape drive pools (e.g. each data storage drive pool is a subset of the tape drives included in the automated data storage library 100).

One or more data storage drives 120a . . . 120n may be associated with one or more proxy servers 140a . . . 140n. A proxy server 140a . . . 140n may be described as server that receives requests intended for another computing device (e.g. another server or appliance) and that acts on behalf of tire requestor (as the requestors' proxy) to obtain the requested service. In this case, the proxy server 140a . . . 140n may act as a proxy for the data storage drives 120a . . . 120n and/or the data storage drive pools. Each proxy server 140a . . . 140n includes a key server selector 142a . . . 142n and stores (or is programmed with) unique identifiers (e.g. Internet Protocol (IP) addresses) 144a . . . 144n of key servers 180a . . . 160n. In certain embodiments, each proxy server 140a . . . 140n includes the IP address of each key server 160a . . . 160n. In alternative embodiments, each proxy server 140a . . . 140n includes some subset of the IP addresses of all of the key servers 160a ... 160n. An IP address may be described as a unique number that is assigned to each computing device connected to a network and that the computing devices use in order to identify and communicate with each other on the computer network according to the Internet Protocol (IP) standard. A proxy server 140a ... 140n may also be described as a conduit that also acts as a protocol converter and adds other functionality (e.g. Internet Protocol (IP) routing). Thus there may be a proxy server between a key server 160a ... 160n and a data storage drive 120a ... 120n (or may not), and, if there is, the proxy server 140a ... 140n acts as a bridge between one type of interface (e.g. Fiber Channel (FC) or RS-422) and another (e.g. IP).

Each proxy server 142a ... 142n is connected to one or more key servers 160a ... 160n. Each key server 160a ... 160n includes a key manager 162a ... 162n and key data 164a ... 164n.

The key manager 162a ... 162n assists encryption-enabled data storage drives 120a ... 120n (e.g. tape drives) in generating, protecting, storing, and maintaining encryption keys that are used to encrypt information being written to, and decrypt information being read from, data storage media 124a ... 121n (e.g. tape cartridges). The key manager 162a ... 162n is capable of serving numerous data storage drives 120a. ... 120n, regardless of where those data storage drives 120a ... 120n reside (e.g. in an automated data storage library 100, connected to mainframe systems through various types of channel connections, or installed in other computing systems.)

The key manager 162a ... 160n processes key generation or key retrieval requests. In particular, when a data storage drive 120a ... 120n is to write encrypted data, the data storage drive 120a ... 120n first requests an encryption key from the key server 160a ... 160n. Upon receipt of the request at the key server 160a ., 160n, the key manager 162a ... 162n generates an encryption key (e.g. an Advanced Encryption Standard (AES) key) and serves the generated encryption key to tire data storage drive 120a ... 120n in two protected forms:

1. As a protected key that is encrypted or wrapped (e.g. using Rivest-Shamir-Adleman (RSA) key pairs). The data storage drive 120a ... 120n writes one or more protected keys to one or more non-volatile areas within the data storage media 124a ... 124n. In certain embodiment, a non-volatile area is a data storage leader (i.e. the front part of a data storage medium 124a ... 124n, before the area that user data is stored). In certain embodiments, the protected key may also be referred to as an Externally Encrypted Data Key (EEDK).

2. As a separately encrypted key for secure transfer to and only readable by the data storage drive 120a ... 120n where it is decrypted upon arrival and used to encrypt the data being written to data storage media 124a ... 124n. Once the data storage drive 120a ... 120n encrypts data with this key and is instructed to unload this data storage medium 124a ... 124a this key is removed from access, usage by or retrieval from the data storage drive 120a ... 120n.

When an encrypted data storage media 124a, ... 124n is to be read, the data storage drive 120a ... 120n sends the protected key read from the data storage media to the key manager 162a ... 162n, along with the request to retrieve tire key needed to read the data storage media 124a ... 124n. The key manager 162a ... 162n unwraps (decrypts) the wrapped (protected) key to access the secret key and then rewraps (encrypts) this secret key with another key for secure data transfer back to the data storage drive 120a ... 120n (only readable by the data storage drive 120a ... 120n), where the rewrapped key is then unwrapped to access the secret key, which is used to decrypt the data stored on the data storage media 124a ... 124n. The key manager 162a ... 162n allows protected keys to be re-encrypted using different keys (e.g. different RSA keys) from the original ones that were used. The key data 164a ... 164n may each be described as a key store of keys used to create (encrypt) or unwrap (decrypt) the protected key. Also, the key data 164 may be described as including version information, an identifier of the proper keys to use in interpreting key data, and the encrypted encryption keys (which are also referred to as protected keys).

Figure 1B:
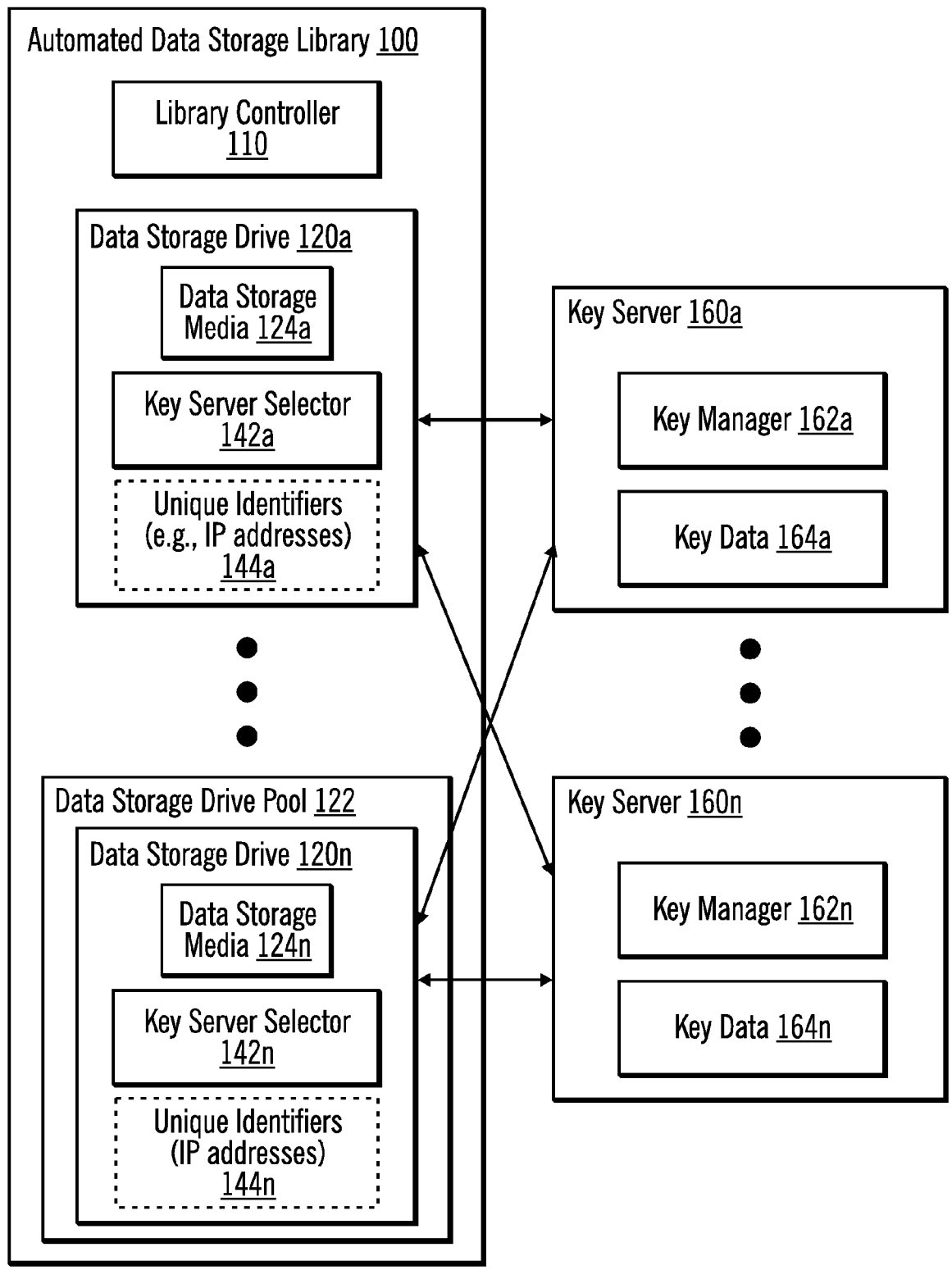
FIG. 1B illustrates details of a computing architecture in accordance with certain alternative embodiments.

FIG. 1B illustrates details of a computing architecture in accordance with certain alternative embodiments. In FIG. 1B, each data storage drive 120a ... 120n includes a key server selector 142a ... 142n. Also in FIG. 1B, each data storage drive 120a ... 120n stores (or is programmed with) or is able to access unique identifiers (e.g. Internet Protocol (IP) addresses) 144a ... 144n of key servers 160a ... 160n. The unique identifiers 144a ... 144n are illustrated in boxes with dashed lines to indicate that they are optionally stored in the data storage drive 120a ... 120n. In certain embodiments, each data storage drive 120a ... 120n includes the IP address of each key server 160a ... 160a In alternative embodiments, each data storage drive 120a ... 120n includes some subset of the IP addresses of all of the key servers 160a ... 160n.

In FIG. 1B, each data storage drive 120a ... 120n is connected to one or more key servers 160a ... 160n. Each key server 160a ... 160n includes a key manager 162a ... 162n and key data 164a ... 164n. In FIG. 1B, although the data storage drives 120a ... 120n in the automated data storage library 100 are illustrated as being directly connected to the one or more key servers 160a ... 160n, the data storage drives 120a ... 120n may be connected to proxy servers (not shown) that are connected to the one or more key sewers 160a ... 160n. In embodiments using proxy servers, the proxy servers may act as proxies for the data storage drives 120a ... 120n and/or the data storage drive pools 122.

Thus, with embodiments, a data storage drive 120a ... 120n in an automated data storage library 100 may have a library proxy (i.e. a proxy coupled to the automated data storage library 100), may be connected to a proxy server or may be capable of acting as a proxy. As an example, the data storage drive 120a ... 120n may try to use the library proxy to access the key server 160a ... 160n, but that library proxy is not able to reach any of the IP addresses that it has (e.g. because of a hardware failure of an Ethernet connection), risen the data storage drive 120a ... 120n may retry access of the key server 160a ... 160n through another proxy server.

In certain embodiments, the unique identifiers 144a ... 144n may be in the proxy servers 140a ... 140n, and there is a function of having a protocol conversion in the proxy servers 140a ... 140n. However, in embodiments in which there is an Ethernet connect native to the data storage drive 120a ... 120n, then the data storage drive 120a ... 120n has unique identifiers 144a ... 144n and is able to walk through the unique identifiers 144a ... 144n (e.g. which may be in list form that is located at the data storage drive 120a ... 120n or is accessible by the data storage drive 120a ... 120n (e.g. the list may be maintained at the automated data storage library 100) ). In such embodiments, any device between the data storage drive 120a ... 120n and the key servers 160a ... 160n may be a hub, switch, or router.

Embodiments enable tire proxy server 140a ... 140n to include the key sewer selector 142a ... 142n and the unique identifiers 144a ... 144n, in which case the proxy server 140a ... 140n is able to try accessing multiple key servers 160a ... 160n until one is available. Also, embodiments enable the data storage drive 120a ... 120n to include the key server selector 142a . . . 142n and either store the unique identifiers 144a . . . 144n or he able to access unique identifiers 144a . . . 144n available externally (e.g. from a central configuration file or from the automated data storage library 100), in which case the data storage drive 120a . . . 120n is able to try accessing multiple key servers 160a . . . 160n until one is available.

Multiple key servers 160a . . . 160n with key managers 162a . . . 162n may be provided to enable high availability (i.e. if one key server 160a . . . 160n is unavailable, another may be used by a data storage drive 120a . . . 120n).

In certain embodiments, a direct key model is implemented. With the direct key model, an application that writes data provides keys to the data storage drives 120a . . . 120n in either a wrapped or direct (key only) manner. The application is not shown in FIG. 1A or 1B, but would be connected to one or more of data storage drives 120a . . . 120n.

Figure 2:
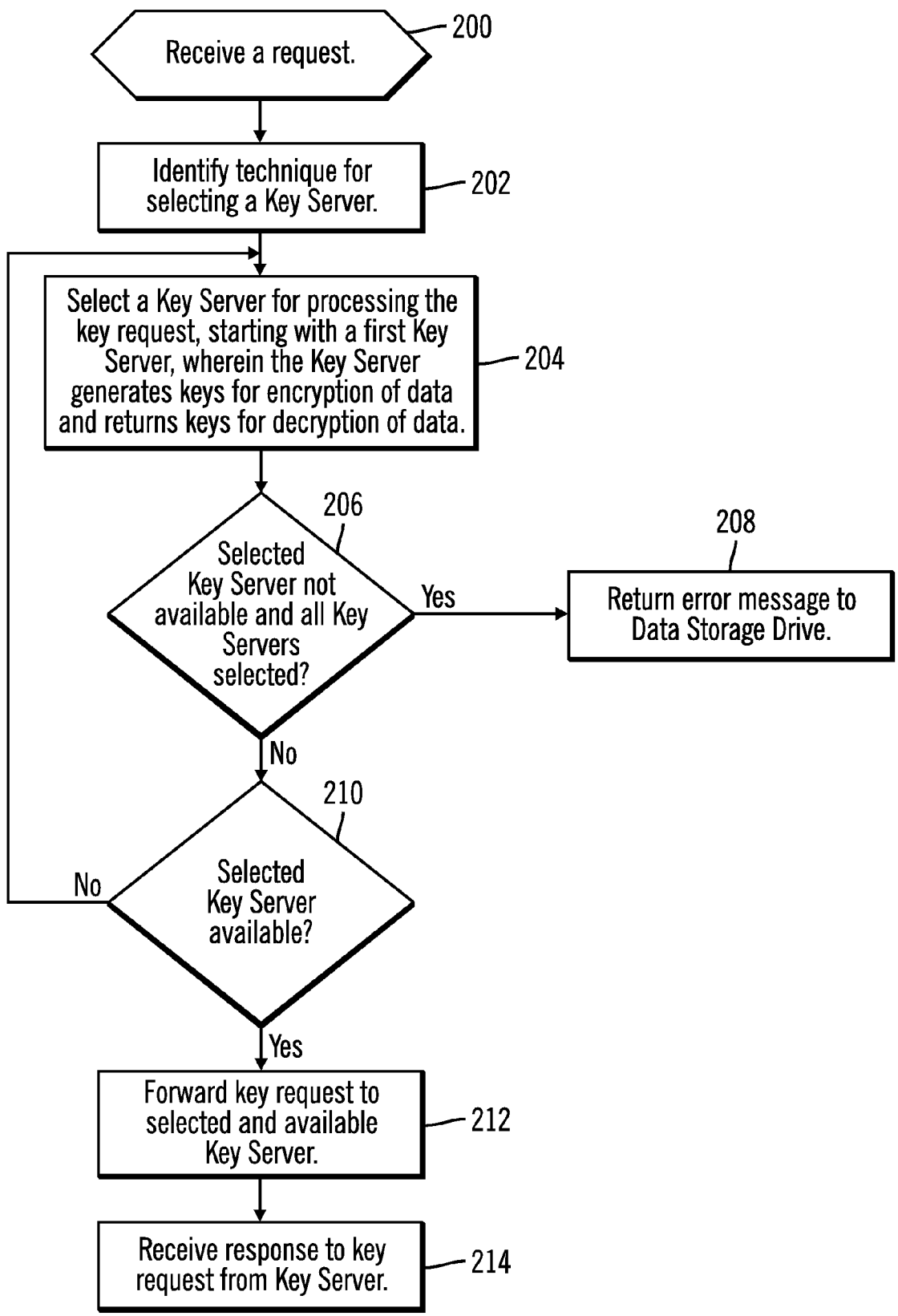
FIG. 2 illustrates logic performed by a key server selector to retrieve key data in accordance with certain embodiments.

FIG. 2 illustrates logic performed by a key server selector 142a . . . 142n to retrieve key data 164a . . . 164n in accordance with certain embodiments. As was described with reference to FIGS. 1A and 1B, the key server selector 142a . . . 142n may be located at a proxy server 140a . . . 140n or at a data storage drive 120a . . . 120n. Control begins at block 200 with key server selector 142a . . . 142n receiving a request (e.g., a key request at a proxy server 140a . . . 140n from a data storage drive 120a . . . 120n or a request to select a key server 160a . . . 160n from a data storage drive 120a . . . 120n). The key request may he a request to the key manager 162a . . . 162n for a key to encrypt data or may be a request to the key manager 162a . . . 162n to decrypt a protected key for use by the data storage drive 120a . . . 120n in decrypting data on data storage media 124a . . . 124n.

In block 202, the key server selector 142a . . . 142n identifies a technique to be used to select the key server 160a . . . 160n to which the key request is to be forwarded. In certain embodiments, the technique to be used may be "soft coded" in that the technique is selected (e.g. by a system administrator or other user) using a mode select setting input via a Graphical User Interface (GUI) provided by embodiments of the invention, in other embodiments, the technique to be used may be "hard coded" (e.g. via a Vital Product Data (VPD) setting, which may be described as a non-volatile device configuration setting). In yet other embodiments, the technique to be used may be selected in a different manner. For example, certain embodiments may pick each technique in a round robin manner (with a switch of the technique on each access). Certain embodiments may continue to used the most recently used function technique and select another technique only upon failures, while certain embodiments may switch techniques occasionally arid measure performance characteristics to start with the most optimal path (highest performing (i.e. a form of load balancing)). Certain embodiments may make a random selection from a list (so that work is spread out among the key managers 162a . . . 162n) or based on a time schedule (e.g. some techniques are used during the day, while others are used during night or where certain techniques are used during specific periods of a 24 hour day).

FIG. 3 illustrates examples of techniques 300 to be used to select a key server 160a . . . 162n in accordance with certain embodiments. Again, multiple unique identifiers (e.g. IP addresses) 144a . . . 144n of key servers 160a . . . 160n are stored. As was described with reference to FIGS. 1A and 1B, the unique identifiers (e.g. IP addresses) 144a . . . 144n may be located at a proxy server 140a . . . 140n or at a data storage drive 120a . . . 120n. In certain embodiments, different types of proxy servers 140a . . . 140n or different data storage drives 120a . . . 120n may have different numbers of IP addresses. As an example, one type of proxy server 140a . . . 140n may support two IP addresses, and another proxy server 140a . . . 140n may support up to eight different IP addresses. Similarly, one data storage drive 120a . . . 120n may have a list of five IP addresses, and another data storage drive 120a . . . 120n may have a list of seven IP addresses.

According to technique 302, the key server selector 142a . . . 142n selects a key server 160a . . . 160n using the order of the IP addresses of key servers 160a . . . 160n. That Is, the key server selector 142a . . . 142n tries one key server 160a . . . 160n after another 160a . . . 160n based on the numerical order of the IP addresses. In certain embodiments, the key server selector 142a . . . 142n identifies one key server 160a . . . 160n as a primary one to be tried first, and then the remaining key servers 160a . . . 160n are tried.

According to technique 304, the key server selector 142a . . . 142n selects a key server 160a . . . 160n using connection information. With this technique, diagnostics may be stored on which connections to key servers 160a . . . 160n were previously successful, and the order of connection may be optimized. For example, the key server 160a . . . 160n to which the key server selector 142a . . . 142n successfully connected a last time may be tried first, whereas a key server 160a . . . 160n for which a connection failed last time may he tried last.

According to technique 306, the key server selector 142a . . . 142n selects a key server 160a . . . 160n based on local IP addresses and remote IP addresses, such that local IP addresses are selected before remote IP addresses.

According to technique 308, the key server selector 142a . . . 142n selects a key server 160a . . . 160n based, on load balancing among the key servers 160a . . . 160n. That is, the key server selector 142a . . . 142n implements automatic load balancing, such as some technique that selects each key server 160a . . . 160n at least once or periodically. Alternatively, the key server selector 142a . . . 142n may implement automatic load balancing by maintaining statistics on measurements of response time, such that the key server selector 142a . . . 142n connects with the key server 160a . . . 160n that provides the shortest response time and such that if that key server 160a . . . 160n becomes slow (e.g. because of loading), the key server selector 142a . . . 142n will instead connect to a keyserver 160a, . . . 160n that is providing faster processing of key request.

In certain embodiments, there are at least two primary (or preferred) IP addresses (e.g. these may correspond to local key servers 160a . . . 160n. In certain embodiments, there are at least two secondary (or alternate) IP addresses (e.g. these may correspond to remote key servers 160a . . . 160n). Thus, certain embodiments may have the data storage drives 120a . . . 120n always try all primary IP addresses that are populated before trying any secondary IP addresses. In certain embodiments, within a set (e.g. primary IP addresses), IP addresses are tried in the order that they are listed (e.g. in a configuration file). In certain embodiments, the first one that was found to work most recently may be tried first (e.g. this could be the key server 160a . . . 160n that is listed as the second of the two primary IP addresses). Certain embodiments provide some mechanism by which the data storage drive 120a . . . 120n periodically tries the other of tire set (e.g. the first of the two primary IP addresses). Certain embodiments provide some mechanism by which the better performing of tire two IP addresses is selected.

Additionally, techniques other than those provided as examples with reference to FIG. 3 may be used without departing from the scope of the application.

Returning to FIG. 2, in block 204, the key sewer selector 142a . . . 142n selects a key server 160a . . . 160n for processing the key request, starting with a first key server 160a . . . 160n. The key sewer 160a . . . 160n generates keys for encryption of data and returns keys for decryption of data.

In block 206, the key server selector 142a . . . 142n determines whether the selected key server 160a . . . 160n is not available (i.e. not able to process the key request) and all key servers 160a . . . 160n have been selected. If so, processing continues to block 208, otherwise, processing continues to block 210. In block 208, the key server selector 142a . . . 142n returns an error message to the data storage drive 120a . . . 120n.

In block 210, the key sewer selector 142a . . . 142n determines whether the selected key server 160a . . . 160n is available. If so, processing continues to block 212, otherwise, processing continues to block 204 to select another key sewer 160a . . . 160n.

Block 212 is reached when the selected key sewer 160a . . . 160n is available (i.e. able to process the key request). In block 212, the key sewer selector 142a . . . 142n forwards the key request to the selected and available key sewer 160a . . . 160n. In block 214, a response to the key request is received by the key server selector 142a . . . 142n from the key manager 162a . . . 162n from the selected and available key server 160a . . . 160n. in embodiments in which the key server selector 142a . . . 142n is located in the proxy server 140a . . . 140n, the proxy server 140a . . . 140n receives and returns the response to the data storage drive 120a . . . 120n.

The automated data storage library encryption solutions that use external key servers desire high availability of the key servers. That is, access to keys and other data should be available even when a given key server, or connection paths to that key server, are down. Embodiments provide such high availability of key servers.

Embodiments are also applicable to encryption of data at rest, which involves connection to a key server, either through proxies, or through direct connection from an encryption device. An encryption device may be described as a data storage device that supports onboard encryption of data stored to that data storage device or may be described as an encryption-capable device.

Figure 4:
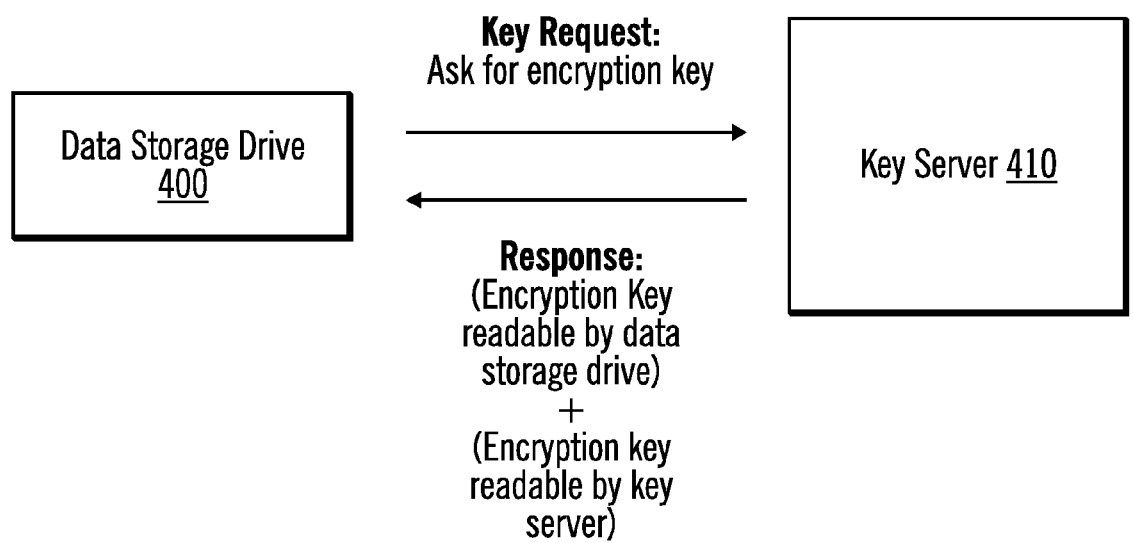
FIG. 4 illustrates a flow of processing on a first write to a data storage medium in accordance with certain embodiments.

FIG. 4 illustrates a flow of processing on a first write to a data storage medium in accordance with certain embodiments. In FIG. 4, a data storage drive 400 sends a key request to ask for an encryption key to a key server 410. The key server 410 provides a response with an encryption key readable by the data storage drive 400 and an encryption key readable by the key server 410.

Figure 5:
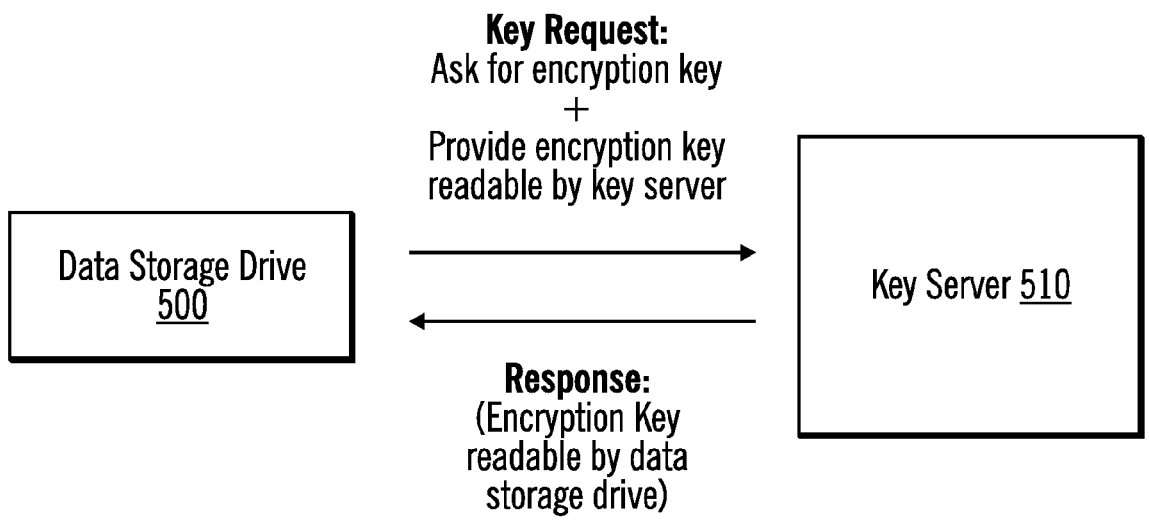
FIG. 5 illustrates a How of processing on a read or append to a data storage medium in accordance with certain embodiments.

FIG. 5 illustrates a flow of processing on a read or append to a data storage medium in accordance with certain embodiments. A data storage drive 500 sends a key request to the key server 510. The key request asks for an encryption key and provides an encryption key readable by tire key server 510. The key server 510 provides a response with an encryption key readable by the data storage drive 500.

Figure 6:
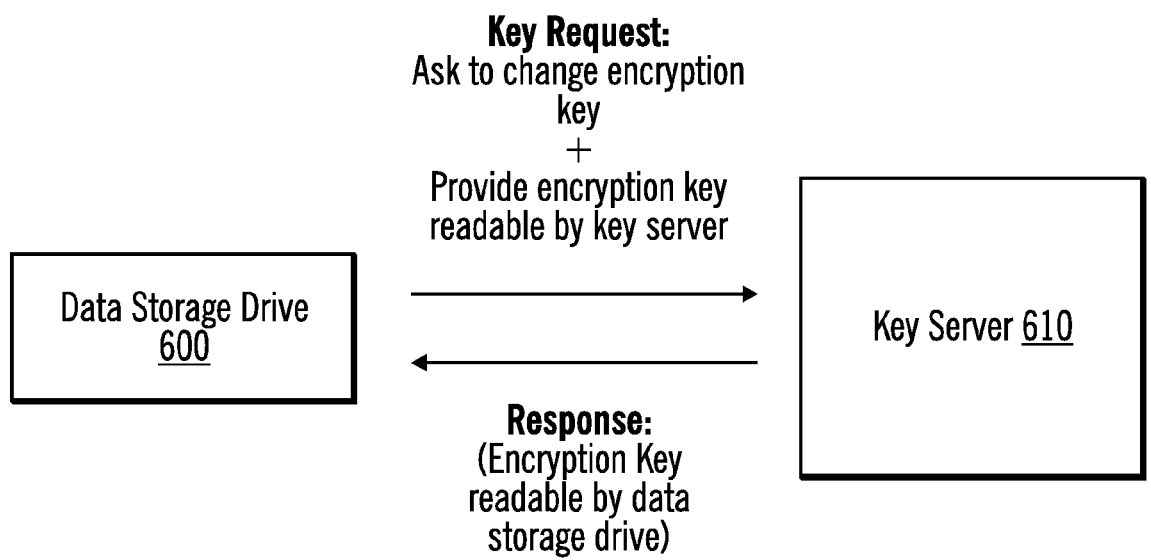
FIG. 6 illustrates a flow of processing on a key translate for a data storage medium in accordance with certain embodiments.

FIG. 6 illustrates a flow of processing on a key translate for a data storage medium in accordance with certain embodiments. A data storage drive 600 sends a key request to the key server 610. The key request asks to change an encryption key and provides an encryption key readable by the key server 510. The key server 510 provides a response with an encryption key readable by the key server 510.

Additional Embodiment Details

The described operations may be implemented as a method, computer program product, or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g. hard disk drives, floppy disks, tape, etc.), volatile and non-volatile memory devices (e.g. a random access memory (RAM). DRAMs, SRAMs, a read-only memory (ROM), PROMs, EEPROMs, Flash Memory, firmware, programmable logic, etc.). Current, examples of optical disks include compact disk—read only memory (CD-ROM), compact disk—read/write (CD-R/W) and DVD.

The code implementing the described operations may further be implemented in hardware logic (e.g. an integrated circuit chip, Programmable Gate Array (PGA), Application Specific: Integrated Circuit (ASIC), etc.). Still further, the code implementing the described operations may be implemented in "transmission signals", where transmission signals may propagate through space or through a transmission media, such as an optical fiber, copper wire, etc. Tire transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIG. 2 describes specific operations occurring In a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIG. 2 may be implemented in software, hardware, programmable and non-programmable gate array logic or in some combination of hardware, software, or gate array logic.

Figure 7:
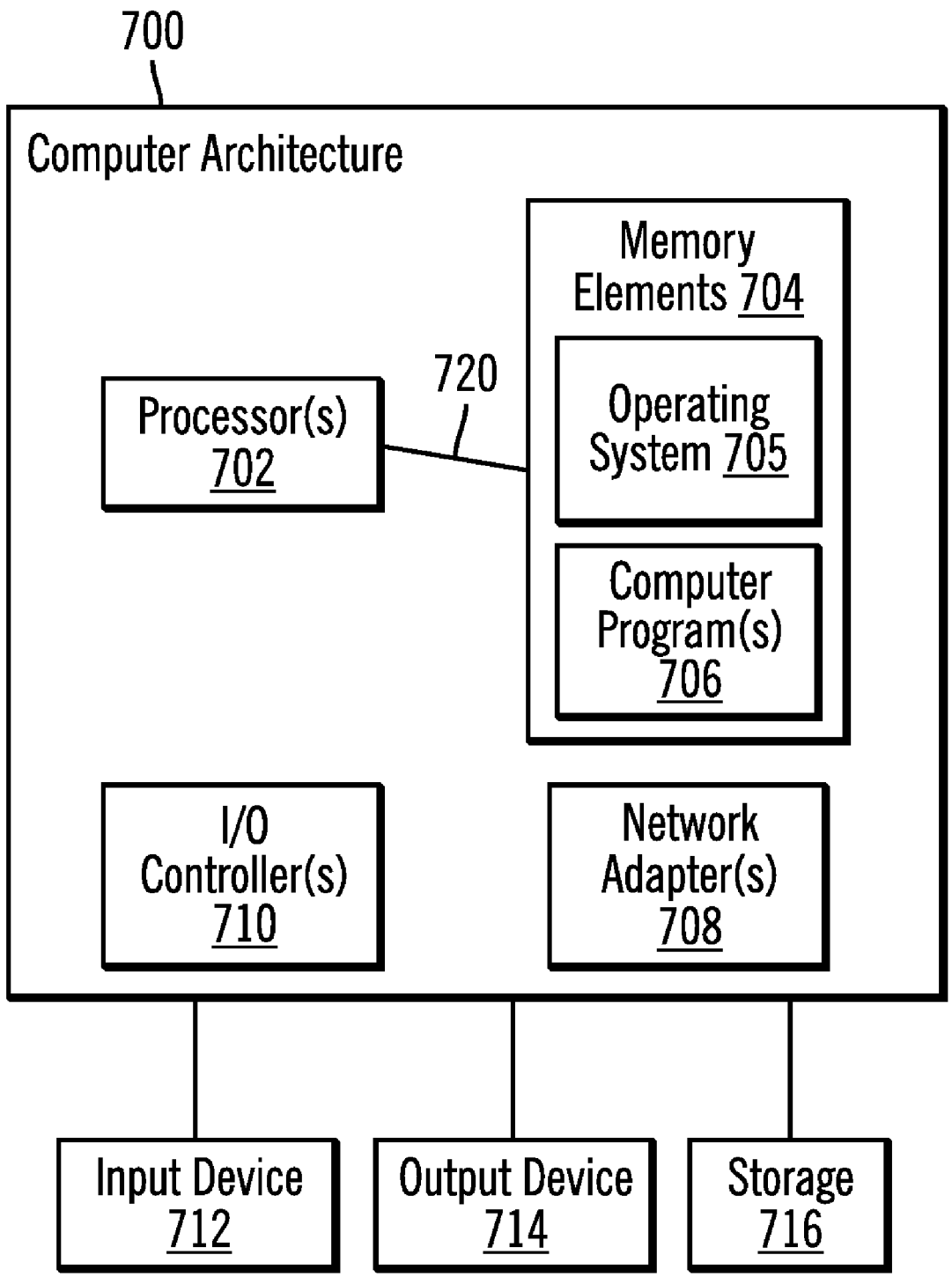
FIG. 7 illustrates a system architecture that may be used in accordance with certain embodiments.

FIG. 7 illustrates a system architecture 700 that may he used in accordance with certain embodiments. Automated data storage library 100, one or more proxy servers 140a . . . 140n and/or one or more key servers 160a . . . 160n may implement system architecture 700. The system architecture 700 is suitable for storing and/or executing program code and includes at least one processor 702 coupled directly or indirectly to memory elements 704 through a system bus 720. The memory elements 704 may include local memory employed during actual execution of the program code, bulk storage, and cache memories which provide temporary storage of at least some program code in order to reduce the number of times code must be retrieved from bulk storage during execution. The memory elements 704 include an operating system 705 and one or more computer programs 706.

Input/Output (I/O) devices 712, 714 (Including but not limited to keyboards, displays, pointing devices, etc.) may be coupled to the system either directly or through intervening I/O controllers 710.

Network adapters 708 may also be coupled to the system to enable the data processing system to become coupled to other data processing systems or remote printers or storage devices through intervening private or public networks. Modems, cable modem and Ethernet cards are just a few of the currently available types of network adapters 708.

The system architecture 700 may be coupled to storage 716 (e.g. a non-volatile storage area, such as magnetic disk drives, optical disk drives, a tape drive, etc.). The storage 716 may comprise an internal storage device or an attached or network accessible storage. Computer programs 706 in storage 716 may be loaded Into the memory elements 704 and executed by a processor 702 in a manner known in the art, The system architecture 700 may include fewer components than illustrated, additional components not illustrated herein, or some combination of tire components illustrated and additional components. The system architecture 700 may comprise any computing device known in the art, such as a mainframe, server, personal computer, workstation, laptop, handheld computer, telephony device, appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended, or any subsequently-filed, claims, and their equivalents.

What is claimed is:

1. A method for key generation and retrieval, comprising:
storing, using a computer including a processor, unique identifiers of two or more key servers, wherein each key server generates keys for encryption of data and returns keys for decryption of data, and wherein a key request can be directed to any one of the two or more key servers;
in response to a data storage drive processing a first write to a data storage medium,
receiving, from the data storage drive, a first key request asking for an encryption key to encrypt data;
identifying a first selection technique from a set of selection techniques for selecting one of the key servers to which the first key request is to be forwarded, wherein the set of selection techniques consists of a selection technique using an order of the IP addresses of the key servers, a selection technique based on local IP addresses and remote IP addresses, a selection technique using connection information, and a selection technique based on load balancing among the key servers;
selecting one of the key servers using the first selection technique by iterating through the two or more key servers until identifying a first key server;
sending, to the first key server, the first key request
in response to the first key request, receiving, from the first key server, a first response that includes an encrypted key and a protected key, wherein the protected key is decryptable by the first key server for key retrieval, and wherein the encrypted key is decrypted by the data storage drive to obtain the encryption key and used to encrypt the data; and
in response to the data storage drive processing a read to the data storage medium,
receiving, from the data storage drive, a second key request asking for a decryption key to decrypt the data;
selecting another one of the key servers using a second selection technique from the set of selection techniques by iterating through the two or more key servers until identifying a second key server;
sending, to the second key server, the second key request that includes the protected key decryptable by the second key server; and
in response to the second key request, receiving, from the second key server, a second response that includes an encrypted decryption key, wherein the encrypted decryption key is decrypted by the data storage drive to obtain the decryption key and used to decrypt the encrypted data.

2. The method of claim 1, wherein the unique identifiers are Internet Protocol (IP) addresses.

3. The method of claim 2, wherein the local IP addresses are selected before the remote IP addresses.

4. The method of claim 1, wherein a last key server to which there was a successful connection is selected before other key servers.

5. The method of claim 1, further comprising:
returning the first response to the first key request to the data storage drive.

6. The method of claim 5, wherein, in response to the data storage drive processing a key translate for the data storage medium, a third key request is received that asks to change a first encryption key and provides a second encryption key readable by each of the key servers, and wherein a third response includes a new encryption key readable by each of the key servers.

7. The method of claim 5, wherein the data storage drive receives the first response, and wherein knowledge of the encryption key to encrypt the data is removed from the data storage drive once the data storage drive has used that encryption key to encrypt the data.

8. Computer-readable storage device storing a computer readable program, wherein the computer readable program, when executed by a processor on a computer, causes the computer to:
store unique identifiers of two or more key servers, wherein each key server generates keys for encryption of data and returns keys for decryption of data, and wherein a key request can be directed to any one of the two or more key servers;
in response to a data storage drive processing a first write to a data storage medium,
receive, from the data storage drive, a first key request asking for an encryption key to encrypt data;
identify a first selection technique from a set of selection techniques for selecting one of the key servers to which the first key request is to be forwarded, wherein the set of selection techniques consists of a selection technique using an order of the IP addresses of the key servers, a selection technique based on local IP addresses and remote IP addresses, a selection technique using connection information, and a selection technique based on load balancing among the key servers;
select one of the key servers using the first selection technique by iterating through the two or more key servers until identifying a first key server;
send, to the first key server, the first key request;
in response to the first key request, receiving, from the first key server, a first response that includes an encrypted key and a protected key, wherein the protected key is decryptable by the first key server for key retrieval, and wherein the encrypted key is decrypted by the data storage drive to obtain the encryption key and used to encrypt the data; and
in response to the data storage drive processing a read to the data storage medium,
receive, from the data storage drive, a second key request asking for a decryption key to decrypt the data;
select another one of the key servers using a second selection technique from the set of selection techniques by iterating through the two or more key servers until identifying a second key server;
send, to the second key server, the second key request that includes the protected key decryptable by the second key server; and
in response to the second key request, receive, from the second key server, a second response that includes an encrypted decryption key, wherein the encrypted decryption key is decrypted by the data storage drive to obtain the decryption key and used to decrypt the encrypted data.

9. The computer-readable storage device of claim 8, wherein the unique identifiers are Internet Protocol (IP) addresses.

10. The computer-readable storage device of claim 9, wherein the local IP addresses are selected before the remote IP addresses.

11. The computer-readable storage device of claim 8, wherein a last key server to which there was a successful connection is selected before other key servers.

12. The computer-readable storage device of claim 8, wherein the computer readable program when executed on a computer causes the computer to:
return the first response to the first key request to the data storage drive.

13. The computer-readable storage device product of claim 12, wherein, in response to the data storage drive processing a key translate for the data storage medium, a third key request is received that asks to change a first encryption key and provides a second encryption key readable by each of the key servers, and wherein a third response includes a new encryption key readable by each of the key servers.

14. The computer-readable storage device product of claim 12, wherein the data storage drive receives the first response, and wherein knowledge of the encryption key to encrypt the data is removed from the data storage drive once the data storage drive has used that encryption key to encrypt the data.

15. A system for key generation and retrieval, comprising:
hardware logic performing operations, the operations comprising:
storing unique identifiers of two or more key servers, wherein each key server generates keys for encryption of data and returns keys for decryption of data, and wherein a key request can be directed to any one of the two or more key servers;
in response to a data storage drive processing a first write to a data storage medium,
receiving, from the data storage drive, a first key request asking for an encryption key to encrypt data;
identifying a first selection technique from a set of selection techniques for selecting one of the key servers to which the first key request is to be forwarded, wherein the set of selection techniques consists of a selection technique using an order of the IP addresses of the key servers, a selection technique based on local IP addresses and remote IP addresses, a selection technique using connection information, and a selection technique based on load balancing among the key servers;
selecting one of the key servers using the first selection technique by iterating through the two or more key servers until identifying a first key server;
sending, to the first key server, the first key request;
in response to the first key request, receiving, from the first key server, a first response that includes an encrypted key and a protected key, wherein the protected key is decryptable by the first key server for key retrieval, and wherein the encrypted key is decrypted by the data storage drive to obtain the encryption key and used to encrypt the data; and
in response to the data storage drive processing a read to the data storage medium,
receiving, from the data storage drive, a second key request asking for a decryption key to decrypt the data;
selecting another one of the key servers using a second selection technique from the set of selection techniques by iterating through the two or more key servers until identifying a second key server;
sending, to the second key server, the second key request that includes the protected key decryptable by the second key server; and
in response to the second key request, receiving, from the second key server, a second response that includes an encrypted decryption key, wherein the encrypted decryption key is decrypted by the data storage drive to obtain the decryption key and used to decrypt the encrypted data.

16. The system of claim 15, wherein the unique identifiers are Internet Protocol (IP) addresses.

17. The system of claim 16, wherein the local IP addresses are selected before the remote IP addresses.

18. The system of claim 15, wherein a last key server to which there was a successful connection is selected before other key servers.

19. The system of claim 15, wherein the operations further comprise:

returning the first response to the first key request to the data storage drive.

20. The system of claim 19, wherein, in response to the data storage drive processing a key translate for the data storage medium, a third key request is received that asks to change a first encryption key and provides a second encryption key readable by each of the key servers, and wherein a third response includes a new encryption key readable each of the key servers.

21. The system of claim 19, wherein the data storage drive receives the first response, and wherein knowledge of the encryption key to encrypt the data is removed from the data storage drive once the data storage drive has used that encryption key to encrypt the data.

22. The system of claim 15, wherein the first key request is received from a tape drive in a tape library.

23. The system of claim 15, wherein the hardware logic is implemented in a proxy server.

24. The system of claim 15, wherein the hardware logic is implemented in the data storage drive.

* * * * *